United States Patent [19]

Lund

[11] Patent Number: 5,780,166
[45] Date of Patent: Jul. 14, 1998

[54] ARRANGEMENT IN CONNECTION WITH A WEAR RESISTANT COATING IN PARTICLE FEEDER AND METHOD FOR PRODUCING THE SAME

[75] Inventor: Ivar Lund, Ottestad, Norway

[73] Assignee: AMECO International AS, Ottestad, Norway

[21] Appl. No.: 652,497

[22] PCT Filed: Dec. 6, 1994

[86] PCT No.: PCT/NO94/00195

§ 371 Date: Jun. 3, 1996

§ 102(e) Date: Jun. 3, 1996

[87] PCT Pub. No.: WO95/15813

PCT Pub. Date: Jun. 15, 1995

[30] Foreign Application Priority Data

Dec. 7, 1993 [NO] Norway ................ 934452

[51] Int. Cl.[6] .................. B05B 15/04; B22D 19/14; B05D 7/22

[52] U.S. Cl. ............. 428/472.1; 428/698; 428/908.8; 427/181; 427/239; 427/403; 164/14; 164/97; 29/527.3; 29/530; 264/299

[58] Field of Search ............... 427/133, 156, 427/181, 239, 403; 418/178; 164/14, 75, 97; 29/527.2, 527.3, 530, DIG. 29, 527.4; 428/472.1, 698, 908.8; 264/299

[56] References Cited

U.S. PATENT DOCUMENTS

| | | | |
|---|---|---|---|
| 3,202,732 | 8/1965 | Braun et al. | 264/30 |
| 5,190,091 | 3/1993 | Revankar | 164/97 |
| 5,194,584 | 3/1993 | Leahy | 530/210 |

FOREIGN PATENT DOCUMENTS

| | | |
|---|---|---|
| 0 462 500 | 12/1991 | European Pat. Off. . |
| 462500 | 12/1991 | European Pat. Off. . |
| 29 34 817 | 3/1981 | Germany . |
| 1553318 | 9/1979 | United Kingdom . |

Primary Examiner—Shrive Beck
Assistant Examiner—Fred J. Parker
Attorney, Agent, or Firm—Merchant, Gould, Smith, Edell, Welter & Schmidt

[57] ABSTRACT

A rotating gate feeder (1) for feeding substantially particulate material comprises a housing (2) and a rotor (3) and also an end cap (8) at each end of the housing. The invention is characterized in that a wear-resistant coating (6) is cast directly on to the inner wall (14) of the housing which faces towards the rotor (3). The inner wall (14) of the housing functions as an outer mold and a purpose-adapted core (15) is used as an inner mold. The housing (2) may be provided at certain points with release zones on the inner walls (14) which face towards the cast wear-resistant coating (6). One or more wear members (12) having greater wear resistance than the molding compound may be embedded therein.

12 Claims, 3 Drawing Sheets

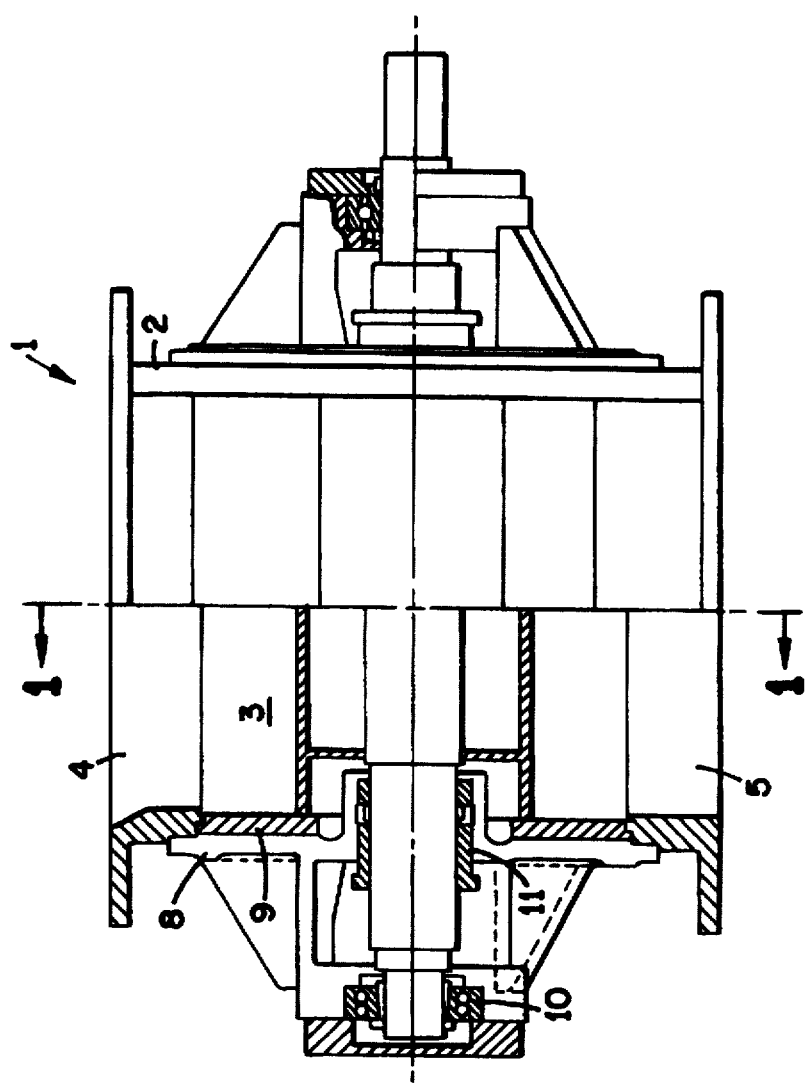
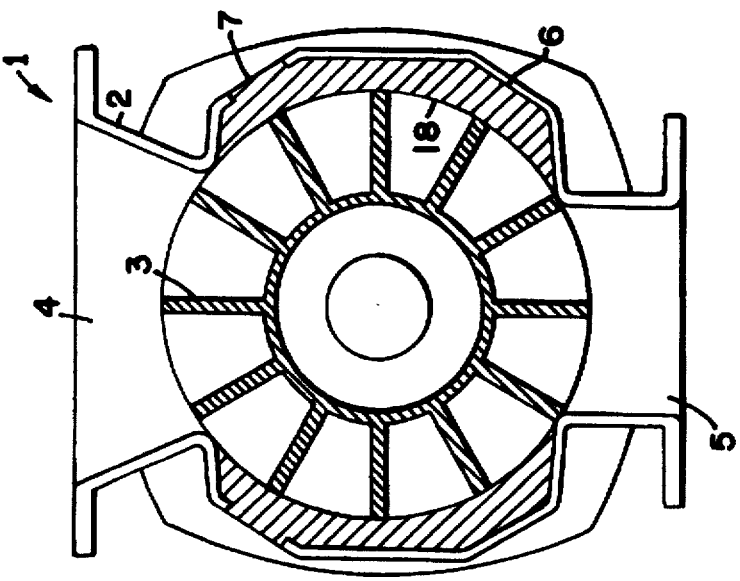

ARRANGEMENT IN CONNECTION WITH A WEAR RESISTANT COATING IN PARTICLE FEEDER AND METHOD FOR PRODUCING THE SAME

FIELD OF THE INVENTION

The invention relates to a wear-resistant coating arrangement in a rotating gate feeder for the feeding of substantially particulate material. The gate feeder comprises a housing and a rotor and also an end cap at each end of the housing.

BACKGROUND OF THE INVENTION

In such gate feeders, or star feeders as they are also called, great wear occurs on the interior surface of the housing when the particulate material comes into contact with and scrapes along the interior surface of the housing. The greatest wear occurs when abrasive material is fed through the feeder whilst it operates at great air pressure differences, which causes "sandblasting" between the rotor blades and the housing. It is therefore common to equip the interior wall of the housing with a wear-resistant coating. This wear-resistant coating may be applied in thin layers of hard chrome, silicon carbide, tungsten carbide or similar, or may consist of a detachable lining of a wear-resistant material which is placed so as to fit closely against the interior wall of the housing. Detachable liners of this kind are known from GB Patent No. 1 182 992 and GB Patent No. 1 161 204. These detachable wear-resistant linings have the advantage that they can easily be replaced when they are worn out, but they have the disadvantage of having to be manufactured with great precision so as to fit inside the housing. They must therefore be manufactured in steel or another material which can readily be processed, and which thus does not have the same high degree of wear resistance. The requirement of precision means that these linings will also be expensive to manufacture. Moreover, the linings must be attached and locked into place with great care.

If the lining does not fit with precision inside the housing, it may move relative to the housing whilst the feeder is in operation, thereby increasing the wear rate considerably and the lining may break and cause damage to both the rotor and the housing.

SUMMARY OF THE INVENTION

To achieve greater wear resistance and to overcome the aforementioned disadvantages, by means of the present invention, a wear-resistant coating is provided which is cast directly on to the inner wall of the housing which faces towards the rotor, the housing inner wall functioning as an outer mould and with a purpose-adapted core as the inner mould.

The wear-resistant coating consists of a large proportion of granular and extremely hard particles which are held together by a castable binder. In this way, a highly wear-resistant surface is obtained which at the same time is rough and provides great through-flow resistance to air containing abrasive particles. In addition to great wear resistance, this solution therefore also provides reduced air leakage through the gap between the surface and the wings of the rotor. This results in reduced wear on the rotor wings.

By producing the wear-resistant coating in this way, a wear-resistant coating is obtained that is adapted with precision to the interior wall of the housing whilst the wear-resistant surface is adapted to the diameter of the rotor. The wear-resistant coating adheres with great strength to the interior wall of the housing and will not be able to fall out even when subjected to great mechanical stress.

To facilitate the removal of the the wear-resistant coating when it needs to be replaced, a release coating may be applied at certain points on the interior wall of the housing, prior to the wear-resistant coating being cast in place. The release coating weakens the adhesion to the interior wall of the housing. This means that when tools are used, such as a hammer and chisel or similar, the wear-resistant coating will become loosened in certain zones and be released on being broken into pieces.

The invention also relates to a method for providing a wear-resistant coating of this kind in that the wear-resistant coating is cast directly on to the interior wall of the housing which faces towards the rotor, with the housing functioning as an outer mould and with a purpose-adapted core functioning as an inner mould.

BRIEF DESCRIPTION OF THE DRAWINGS

The invention will be explained in more detail below with reference to the attached figures where:

FIG. 1 illustrates the housing with a wear-resistant coating cast in place and the rotor mounted in place.

FIG. 2 is a lateral view of the gate feeder and with wear-resistant coating applied to the end caps.

DESCRIPTION OF THE PREFERRED EMBODIMENT

Figure 4:
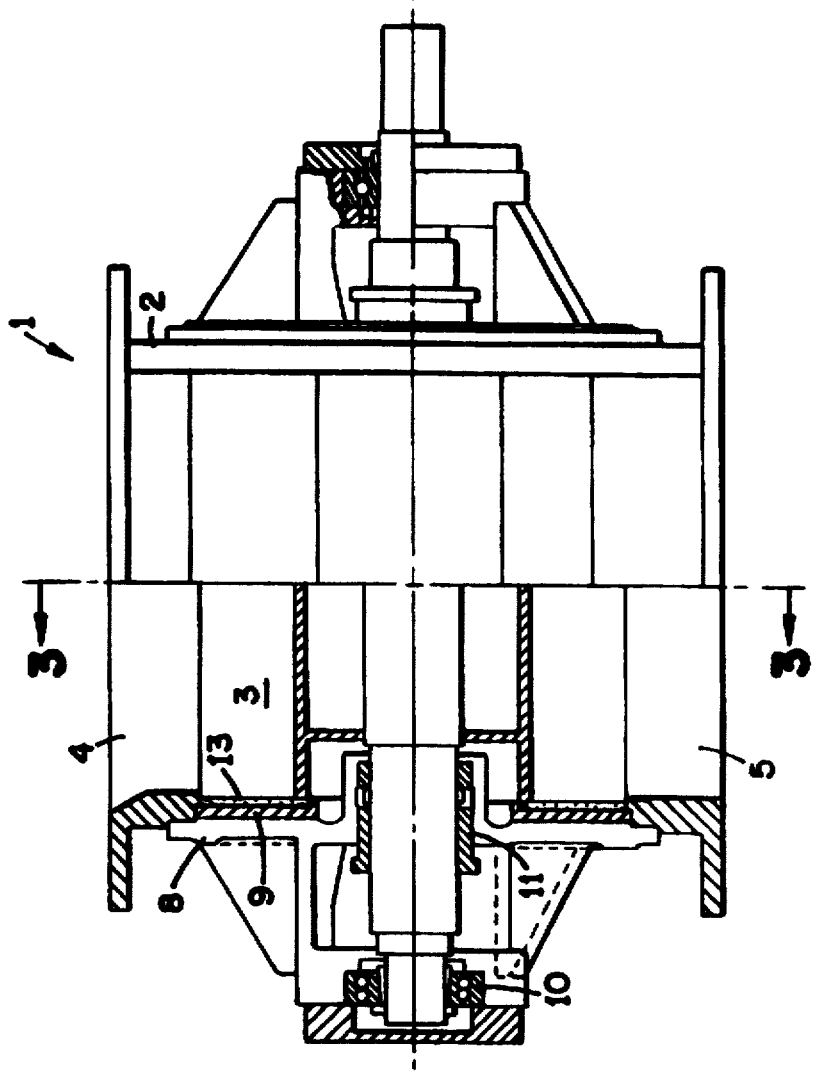
FIG. 4 is a lateral view of the gate feeder illustrated in FIG. 3, where embedded wear members are also found on the end caps.

FIG. 1 illustrates a gate feeder 1 comprising a housing 2 and a rotor 3. Particulate material is fed in through an inlet opening 4 and fed out with the aid of the rotor 3 through outlet opening 5.

A wear-resistant coating 6 is disposed on the internal wall 14 of the housing which faces the rotor 3. The housing is equipped with a hole 7 through which the moulding compound which forms the wear-resistant coating is poured.

FIG. 2 illustrates end caps 8 which have a wear-resistant coating 9 cast on to the internal surface thereof. In the end caps there are also provided bearings 10 on which the rotor is mounted and seals 11 which seal against the housing 2.

Figure 3:
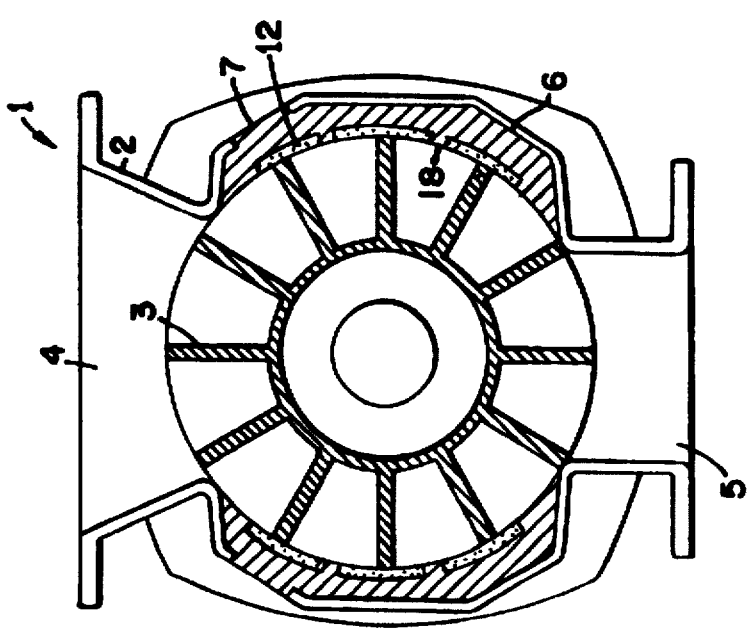
FIG. 3 illustrates the same as FIG. 1, but in this case wear members are embedded in the wear-resistant coating.

To further enhance the wear-resistant properties of the wear-resistant coating or for use which requires other properties, in the embodiment illustrated in FIG. 3, wear members 12 are embedded in the moulding compound. These may be in a homogenous (compact) version of the granular material in the moulding compound or other materials of great wear resistance. The end caps 8 may similarly be equipped with such wear members 13.

Figure 5:
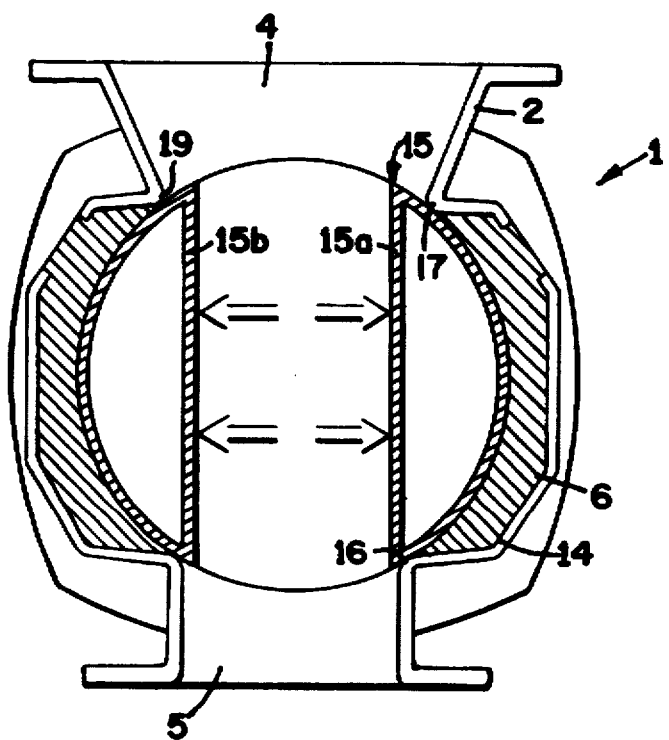
FIG. 5 shows the housing whilst the wear-resistant coating is being cast with the core in place.

The interior wall 14 of the housing which faces towards the rotor 3 forms the outer mould for casting the wear-resistant coating 6. As an inner mould an especially purpose-adapted core 15 is used. This has the same diameter as the largest diameter of the rotor. The surface 19 is very smooth so that the surface 18 of the wear-resistant coating will be as even as possible. The core 15 may be in one piece, or may consist of two portions 15a and 15b as shown in FIG. 5. This makes the insertion and withdrawal of the core after moulding easier. The core portions are held in place by non-illustrated press means are disposed between the core portions and press these apart from one another against the contact surfaces 16 and 17 on either side of the housing.

Prior to casting the coating, a release coating may be applied to certain zones of the inner wall 14 of the housing 2. The proportion of such release coating in relation to the part of the inner wall of the housing to which no release coating is applied, may be varied according to how well one would like the wear-resistant coating to adhere to the inner wall of the housing. Different types of release coating may also be selected with regard to the adhesive properties thereof.

In order to embed wear members 12 in the surface of the moulding compound which faces the rotor, wear members may be glued or attached in some other way on to the core prior to the insertion of the core into the housing. During the casting of the wear-resistant surface these will adhere to the moulding compound. This adhesion will be greater in strength than the adhesion to the core, such that when the core is withdrawn the wear members will remain in the cast wear-resistant coating. To facilitate the withdrawal of the core, the adhesive between the wear members and the core may be of such a nature that the adhesion between the core and the wear members ceases or is reduced when the adhesive is heated or exposed to certain chemicals.

A wear-resistant coating and wear members may in a similar way be cast on to the end caps, but the process in this case will be far simpler than for the housing as a counter-mould may be used that is completely flat.

In situ tests have shown that the wear-resistant coating according to the present invention has a considerably longer life than conventionally applied coatings.

I claim:

1. A wear-resistant coating arrangement in a rotating gate feeder comprising a housing with an inner wall and end caps secured to the housing at opposite ends thereof so as to define a housing interior, and a rotor mounted for rotation within the interior of the housing; and a wear-resistant coating cast directly onto the inner wall of the housing radially outside of the rotor.

2. The arrangement according to claim 1, further comprising at least one filler hole extending through the housing, at least a portion of said wear-resistant coating extending into said at least one filler hole.

3. The arrangement according to claim 1, further comprising a release coating on at least a portion of the inner wall underneath the wear-resistant coating.

4. The arrangement according to claim 1, further comprising at least one wear member embedded in said wear-resistant coating, said at least one wear member having greater wear resistance than said wear-resistant coating.

5. The arrangement according to claim 1, wherein the wear-resistant coating includes an inner curved surface having a radius of curvature greater than an outermost radial extent of the rotor.

6. The arrangement according to claim 5, wherein the wear-resistant coating comprises two separate coating sections which are cast onto opposite sections of the inner wall of the housing.

7. The arrangement according to claim 1, wherein the wear-resistant coating comprises particles held together by a binder, an inner surface of said coating being uneven such that fluid flow through a gap between the inner surface and an outer diameter of the rotor is resisted.

8. A method for providing a wear-resistant coating in a rotating gate feeder of the type including a housing having an inner wall, a rotor and end caps at each end of the housing, the method comprising casting the wear-resistant coating directly onto the inner wall of the housing by pouring a molding compound into a space formed between the inner wall and a core that is spaced from the inner wall, and allowing the molding compound to solidify.

9. The method according to claim 8, wherein the molding compound is poured into the space between the inner wall and the core through a hole in the housing.

10. The method according to claim 8, further comprising applying a release coating to at least one location on the inner wall of the housing prior to the wear-resistant coating being cast in place.

11. The method according to claim 8, wherein prior to pouring the molding compound, attaching at least one wear member to a surface of the core that faces the inner wall in a manner so that the wear member is detachable therefrom, and removing the core subsequent to pouring such that the at least one wear member remains embedded within the coating after solidification of the molding compound.

12. The method according to claim 8, wherein the molding compound comprises a mixture of particles and a binder, and after solidifying the molding compound, an inner surface of said coating is uneven.

* * * * *

UNITED STATES PATENT AND TRADEMARK OFFICE
CERTIFICATE OF CORRECTION

PATENT NO. : 5,780,166

DATED : JULY 14, 1998

INVENTOR(S) : LUND

It is certified that error appears in the above-identified patent and that said Letters Patent is hereby corrected as shown below:

Col. 3, line 39, claim 1: insert —having a diameter which is— after the word "rotor"

Col. 3, line 41, claim 1: insert —comprising wear-resistant particles and a castable binder— after the word "coating"

Col. 3, line 42, claim 1: insert —the diameter of— after the word "of"

Col. 4, line 15-17, claim 7: delete "the wear resistant coating comprises particles held together by a binder," after the word "wherein"

Col. 4, line 17, claim 7: "being" should read —is—

Col. 4, line 21, claim 8: "of the type including" should read —with—

Col. 4, line 25, claim 8: insert —comprising wear resistant particles and a castable binder— after the word "compound"

Col. 4, line 27, claim 8: insert —to form the wear resistant coating— after the word "solidify"

Col. 4, line 31, claim 10: "one location on" after the word "least" should read —a portion of—

UNITED STATES PATENT AND TRADEMARK OFFICE
CERTIFICATE OF CORRECTION

PATENT NO. : 5,780,166

DATED : JULY 14, 1998

INVENTOR(S) : LUND

It is certified that error appears in the above-identified patent and that said Letters Patent is hereby corrected as shown below:

Col. 4, lines 41-43, claim 12: delete "the molding compound comprises a mixture of particles and a binder and" after the word "wherein"

Col. 4, line 44, claim 12: insert —such that fluid flow through a gap between the inner surface and an outer diameter of the rotor is resisted— after the word "uneven"

Signed and Sealed this

Fourth Day of January, 2000

Attest:

Attesting Officer

*Acting Commissioner of Patents and Trademarks*